Oct. 2, 1956 W. D. MARTIN 2,765,446

VARIABLE DELAY LINE

Filed Dec. 5, 1951

INVENTOR
WILLIAM D. MARTIN
BY Allen V. Hazeltine
ATTORNEY

United States Patent Office 2,765,446

Patented Oct. 2, 1956

2,765,446

VARIABLE DELAY LINE

William D. Martin, Albany, N. Y., assignor to Philco Corporation, Philadelphia, Pa., a corporation of Pennsylvania Application December 5, 1951, Serial No. 259,949

8 Claims. (Cl. 333—30)

The present invention relates to delay lines and, more particularly, to delay lines whose effective delay time can be readily controlled.

Delay lines have long been well known items of electrical apparatus and have been used in a variety of applications where it was necessary to delay the passage of an electrical signal through a particular portion of its path. Such delay lines have frequently taken advantage of the fact that the velocity of propagation of mechanical vibrations is much lower than that of electrical signals, by transforming the electrical signal into mechanical vibrations, sending them down a mechanical path of predetermined length and reconverting them into an electrical signal at the far end. Where these delay lines were made of a solid material, such as fused quartz, for example, adjustment of their physical lengths and resultant adjustment of their time delays was altogether impractical. Where they were made of tubes filled with a liquid such as mercury, they could be mechanically adjusted primarily by changing the relative positions of their electromechanical transducers. This was unsatisfactory, too, first because it required penetration of adjustment mechanisms into the sealed tube and secondly because the transducers had to be displaced from positions which were usually highly critical with respect to spurious reflections and other signal distortion.

It is, accordingly, a primary object of the invention to provide a delay line whose delay time can be controlled without physical penetration of its structure.

It is another object of the invention to provide a delay line whose delay time is adjustable by means entirely external of the delay line structure and which leave the electromechanical transducer locations substantially unaffected.

It is still another object of the invention to provide a delay line whose delay time is electrically adjustable.

These objects of the invention and others which will appear are accomplished by the provision of an electromechanical delay line containing a colloidal suspension of a magnetic material and provided with means for establishing a unidirectional magnetic field of variable intensity through the colloidal medium. Variation of the intensity of the magnetic field produces variation of the characteristics of the colloidal suspension and consequent variation in the rate of propagation of mechanical vibrations therethrough, whereby the amount of delay produced in the delay line is made controllable throughout a relatively wide range of values.

Figure 1:
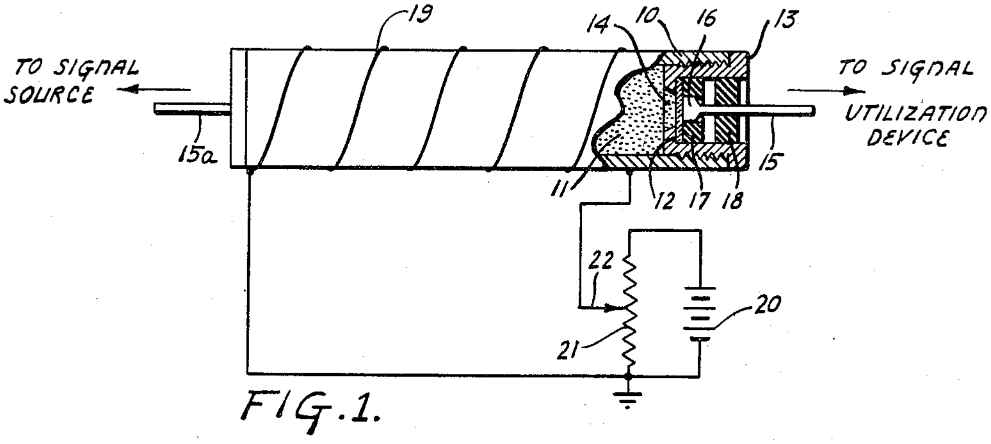
Figure 2:
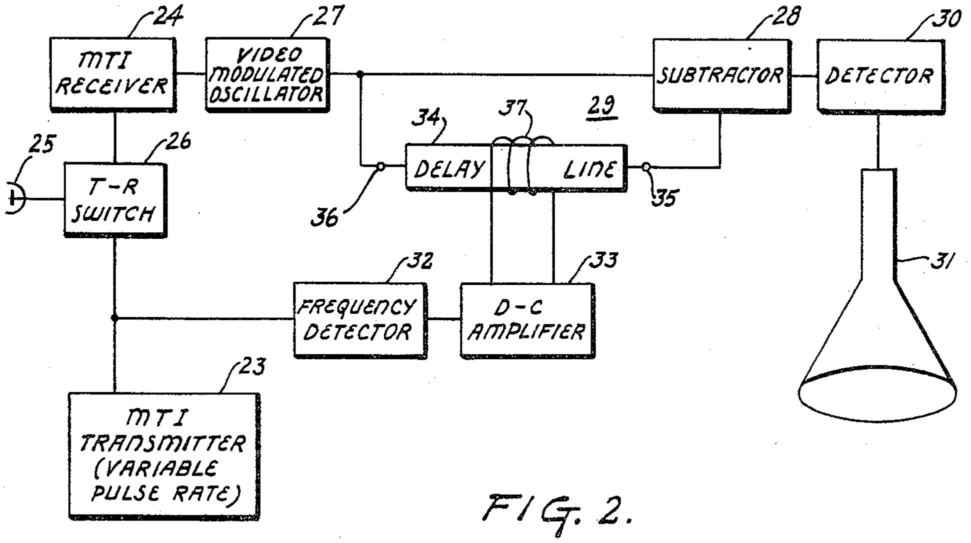

The manner in which such a delay line may be particularly constructed and utilized is explained in detail hereinafter, the explanation being made with reference to the accompanying drawings wherein:

Figure 1 shows a cross-sectional view of a delay line, embodying my invention, with manual delay time adjusting means; and Figure 2 shows a delay line embodying my invention and provided with means for automatically adjusting its delay time in accordance with the requirements of the system of which it forms a part.

Referring now to Figure 1 of the drawings, the apparatus illustrated therein comprises a hollow cylindrical container 10 filled with a colloidal suspension 11 of a magnetic material whose detailed characteristics will be examined hereinafter. This suspension forms the mechanical path of the delay line and the container is therefore provided with suitable electromechanical transducers at each end. At the end where the container wall is broken away to permit a view of the interior, this transducer is seen to consist of a quartz crystal 12 mounted in the suspension-confronting end of a terminal housing 13 and communicating with the suspension through a flared aperture 14 in this housing. The housing and the inner surface of the container 10 may be suitably threaded so as to assure retention of the housing in its proper position. Electrical connection from an external signal circuit is made to the crystal 12 by a steel electrode 15 provided with a flared portion 16 which abuts against the crystal. The other end of the electrode protrudes from the housing through suitable insulating supports 17 and 18. The diameter of this protruding portion of the electrode is preferably such as to render it suitable for use as the center conductor of a coaxial cable termination of standard size. The terminal housing 13 is preferably made of a suitable metal to which the outer conductor of the coaxial cable may be directly joined. The container 10 may be made of either non-conductive material, such as plastic, Bakelite or fiber, or of a suitable conductive material. However, if a conductive material is employed, it should be a non-magnetic one, such as aluminum, to permit the establishment of the magnetic field within it. The use of a conductive material in this instance may be preferable to provide shielding of the colloidal suspension from stray electric fields and to provide an electrical connection between the outer conductors of coaxial cables connected to the input and output ends of the delay line.

While the detailed construction of only one terminal has been shown, it will be understood that the other end of the delay line is similarly equipped, an electrode 15*a* similar in all respects to electrode 15 being shown protruding from that end of the container. It will be understood that no patentable significance attaches to the particular terminal construction illustrated, which is merely illustrative of one suitable form.

In accordance with the invention, there is coiled about the container 10, a conductor 19 which is supplied with unidirectional current from a battery 20 through a potentiometer 21. When the variable arm 22 of this potentiometer is at the grounded end of the resistor, no current will flow through the conductor coil, and no magnetic field will be set up within the container 10. Consequently, the particles of magnetic material in suspension within the container will remain in that condition and mechanical vibrations produced at one end of the container in response to electrical signals applied to the transducer located at that end will propagate through the container at a predetermined velocity which is readily ascertainable by measurement for any particular colloidal medium. As the variable arm of the potentiometer is moved along the resistor, however, more and more current will flow through the coil and a magnetic field of correspondingly increasing intensity will be produced within the container 10. I have found that the velocity of propagation of mechanical vibrations through this medium increases as the magnetic field intensity is increased. I believe that this is due to the loss of freedom of motion by the magnetic particles which causes the entire suspension to assume increasingly the characteristics of a solid. Particularly, I believe that the modulus of elasticity of the suspension increases with increasing magnetic field intensity and, since the velocity of propagation is proportional to the square root of the modulus of elasticity, the former will also increase. In any event, no matter what the theoretical explanation may be, the increase in velocity of propagation with increasing magnetic field is well established and so is the resulting decrease in the time delay produced by the delay line. I have also found that the processes underlying the operation of my variable delay line are reversible, for diminution of the magnetic field intensity causes the time delay to increase and finally return to substantially the value which it had before the establishment of a magnetic field.

Suitable fillers for the container 10 may consist of chemically inactive and preferably dielectric fluids such as lubricating oil, glycerine, and the like, containing a high concentration of particles of a ferromagnetic substance such as iron, those particles being of sufficiently small size to enter into suspension in the fluid.

While applications of delay lines are numerous in the art, there are many phases of development in which the lack of a delay line whose delay time is electrically variable has long been seriously felt. Thus the application of delay lines to so-called radar moving target indicator (MTI) systems is well known (see pp. 631–635 in Radar Systems Engineering, which is volume I of the Massachusetts Institute of Technology Radiation Laboratory Series, published 1947, by McGraw-Hill Book Company, Inc.). In such systems, a conventional radar pulse is transmitted, its echo is received, delayed by one pulse interval and then subtracted from the received signal passing through an undelayed channel. If the echoes are produced by a stationary object, they will differ in reception time by exactly one pulse interval and will cancel by subtraction. No indication of the reception of such echoes will then be produced. Pulses reflected from a moving target will produce received signals which are time-spaced by intervals different from the pulse interval. They will not cancel and may therefore be utilized to produce indications of the presence of the moving target.

With a delay line having fixed delay time, the system hereinbefore outlined will be operative only at one particular pulse repetition rate. It is, however, advantageous to be able to vary the pulse repetition rate, both because this reduces the hazard of enemy jamming and because it eliminates the nulls in the system response which occur at certain target velocities. The manner in which a delay line constructed in accordance with my invention may be utilized in an MTI system having variable pulse repetition rate is illustrated in Figure 2 of the drawings to which more detailed reference may now be had. The overall system is conventional in that it includes a transmitter 23 and a receiver 24, both connected to the same antenna 25 through a T–R switch 26, the video output of the receiver being utilized to modulate the amplitude of the signal produced by oscillator 27 which operates at a frequency suitable for excitation of the delay line crystal and whose output is supplied to a subtractor 28 through two parallel paths, one of which includes a delay line 29. The output of the subtractor is detected at 30 and displayed on cathode ray tube 31.

With the exception of the delay line 29, all of the components hereinbefore enumerated are entirely conventional and may take the various forms disclosed in the literature of the art. Specifically, such components are described in the aforementioned volume I of the M. I. T. Radiation Laboratory Series, as well as in other volumes of the same series. Accordingly, no detailed description or illustration of these components appears to be needed here.

In accordance with the invention, there is further provided a frequency detector 32 and a D. C. amplifier 33 serially connected to the output of transmitter 23. The frequency detector is directly supplied with the transmitted signal and is responsive thereto to produce a unidirectional potential whose magnitude varies in accordance with variations in the transmitter pulse frequency. A variety of conventional frequency meters and similar detectors are available for this purpose. The output of the frequency detector is then utilized to control the gain of D. C. amplifier 33 which latter performs, for the delay line 29 of Figure 2 the same functions as the battery-rheostat combination 20, 21 of Figure 1 performs for the delay line to which it is connected. This delay line 29 may be substantially identical with that shown in Figure 1 and it has, accordingly, been represented only diagrammatically by a rectangle 34 which symbolizes the main body of the delay line and which is connected in the signal circuit by terminals 35 and 36 corresponding to electrodes 15 and 15a of Figure 1. A conductor 37, similar in construction and function to conductor 19 of Figure 1, is shown coiled about the body of the delay line, the ends of this conductor now being connected to the D. C. amplifier output. The circuit including frequency detector 32 and D. C. amplifier 33 is then so arranged that an increase in transmitter pulse repetition rate produces an increase in unidirectional current flow through conductor 37 of the delay line assembly. This, in turn, causes the delay line suspension to change its characteristics so as to propagate mechanical vibrations more rapidly, as explained in connection with Figure 1, and the delay time of the device decreases. By appropriate selection of the delay line and control circuit parameters, well within the capability of those skilled in the art, the effective delay time may thus always be kept equal to one pulse interval, as required for the successful operation of the MTI system.

Inasmuch as modifications of the above-described apparatus will occur to those skilled in the art without departing from my inventive concept, I desire the scope of the latter to be limited only by the appended claims.

I claim:

1. A variable delay line comprising: a pair of spaced electromechanical transducers; substances forming a mechanical path connecting said transducers, said substances including a magnetic material in colloidal suspension, said suspension being operative to propagate mechanical vibrations applied thereto with predetermined velocity; and means for applying a unidirectional magnetic field to said suspension, thereby to increase the velocity of propagation of mechanical vibrations applied thereto.

2. A variable delay line comprising: a pair of spaced electromechanical transducers; substances forming a mechanical path connecting said transducers, said substances including a magnetic material in colloidal suspension, said suspension being operative to propagate mechanical vibrations applied thereto with predetermined velocity; and means for applying a unidirectional magnetic field of controllable intensity to said suspension, thereby to produce a controllable increase in the velocity of propagation of mechanical vibrations applied thereto.

3. A variable delay line comprising: a container made of non-magnetic material; a pair of electromechanical transducers spaced within said container; electrical connections from outside said container to each of said transducers; a magnetic material in colloidal suspension filling said container, said suspension being operative to propagate mechanical vibrations applied thereto with predetermined velocity; and means for applying a unidirectional magnetic field to said suspension thereby to increase the velocity of propagation of mechanical vibrations applied thereto.

4. A variable delay line comprising: a container made of non-magnetic conductive material; a pair of electromechanical transducers spaced within said container; insulated electrical connections from outside said container to each of said transducers; a magnetic material in colloidal suspension filling said container, said suspension being operative to propagate mechanical vibrations applied thereto with predetermined velocity; and means for applying a unidirectional magnetic field to said suspension thereby to increase the velocity of propagation of mechanical vibrations applied thereto.

5. A variable delay line comprising: a pair of spaced electromechanical transducers; substances forming a mechanical path between said transducers, said substances including particles of ferromagnetic material in colloidal suspension in a chemically inactive fluid, said suspension being operative to propagate mechanical vibrations applied thereto with predetermined velocity; and means for applying a unidirectional magnetic field to said suspension, thereby to increase the velocity of propagation of mechanical vibrations applied thereto.

6. A variable delay line comprising: a pair of spaced electromechanical transducers; substances forming a mechanical path between said transducers, said substances including particles of ferromagnetic material in colloidal suspension in a dielectric fluid, said suspension being operative to propagate mechanical vibrations applied thereto with predetermined velocity; and means for applying a unidirectional magnetic field to said suspension, thereby to increase the velocity of propagation of mechanical vibrations applied thereto.

7. A variable delay line comprising: a pair of spaced electromechanical transducers; substances forming a mechanical path connecting said transducers, said substances including iron particles in colloidal suspension in lubricating oil, said suspension being operative to propagate mechanical vibrations applied thereto with predetermined velocity; and means for applying a unidirectional magnetic field to said suspension, thereby to increase the velocity of propagation of mechanical vibrations applied thereto.

8. A variable delay line comprising: a container made of non-magnetic material; a pair of electromechanical transducers spaced within said container; electrical connections from outside said container to each of said transducers; a magnetic material in colloidal suspension filling said container, said suspension being operative to propagate mechanical vibrations applied thereto with predetermined velocity; a conductor coiled about the outside of said container; and a source of controllable unidirectional potential connected to said conductor and operative to produce a controllable, unidirectional current flow therein, thereby to produce a unidirectional magnetic field of controllable intensity through said suspension and to produce a controllable increase in the velocity of propagation of mechanical vibrations applied thereto.

No references cited.